Jan. 6, 1959 R. OLSON Re. 24,585

VINE CLEARING DEVICE

Original Filed March 2, 1955 2 Sheets-Sheet 1

INVENTOR.
RUDOLPH OLSON
BY Reifand Gregory
ATTORNEY

VINE CLEARING DEVICE

Original Filed March 2, 1955 2 Sheets-Sheet 2

INVENTOR.
RUDOLPH OLSON
BY Reifand Gregory
ATTORNEY

United States Patent Office

Re. 24,585
Reissued Jan. 6, 1959

24,585

VINE CLEARING DEVICE

Rudolph Olson, Franklin, Minn., assignor to Dahlman Manufacturing Company, Braham, Minn., a corporation of Minnesota Original No. 2,802,326, dated August 13, 1957, Serial No. 491,583, March 2, 1955. Application for reissue February 17, 1958, Serial No. 715,841

8 Claims. (Cl. 171—12)

Matter enclosed in heavy brackets [ ] appears in the original patent but forms no part of this reissue specification; matter printed in italics indicates the additions made by reissue.

This invention relates to a device to be used in connection with a two-row potato digger or a two-row potato combine and hereinafter referred to as a harvester. In harvesting potatoes it is found that the potato vines gather in the space between the aprons of said harvester and directly in front of said space. In a heavy vine area it has been found that said vines can clog up said space between said aprons and stop the progress of said harvester in a space of twenty to twenty-five feet. Potato harvesters are generally drawn by a tractor and in a heavy vine area it is not unusual for the entire space between the harvester and the tractor to be entirely filled with an accumulation of said vines. The vines directly in front of the aprons will be carried away by the conveyors moving on said aprons but the central area or the space between said aprons will become filled with and clogged up by an accumulation of said vines. The vines easily intertwine to pile up into a tangled mass making the operation of harvesters difficult. Many methods have been attempted to overcome this condition including the relatively expensive one of having a person stationed at the front of a harvester with a tool in hand to prevent the gathering of said vines. It is desirable to have an economical and efficient means for preventing said gathering of vines.

It is an object of this invention therefore to provide a device to be used in connection with a two-row potato harvester for breaking up and clearing away vines which tend to gather at the front of said harvester in the space between its aprons and to prevent the accumulation of said vines in front of said space.

It is another object of this invention to provide a device to be used in connection with a two-row potato harvester to be disposed [between] *adjacent* the aprons of said harvester and to have members operating as an integral part of said harvester for clearing out vines [from said space and] to prevent their accumulation in front [thereof] *of said aprons.*

It is a further object of this invention to provide a device to be used in connection with a two-row potato harvester to be disposed between the aprons of said harvester comprising a member pivoted to the frame of said harvester, a plurality of spaced blade members or teeth depending from said member, and means carried by said harvester for reciprocating said member and said teeth depending therefrom.

It is a more specific object of this invention to provide a device to be used in connection with a two-row potato harvester comprising a supporting bar disposed between the aprons of said harvester and having one end pivoted to the frame of said harvester substantially at the rear of said aprons, a plurality of spaced teeth depending from said bar, a swinging member having one end pivoted to said bar and having its other end pivoted to the frame of said harvester, a crank having one end pivoted to said member, and means carried by said harvester for rotating said crank and actuating said swinging member to reciprocate said teeth for clearing away vines from the space between said aprons.

These and other objects and advantages of the invention will be fully set forth in the following description made in connection with the accompanying drawings in which like reference characters refer to similar parts throughout the several views and in which.

Figure 2:
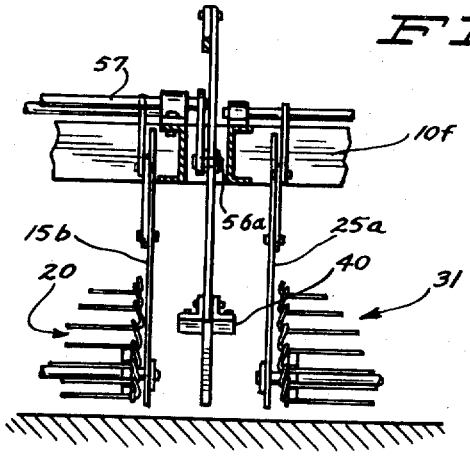
Fig. 2 is a *partial sectional* [broken away portion of a] view [in elevation] taken on line 2—2 of Fig. 1, as indicated by the arrows.
Figure 3:
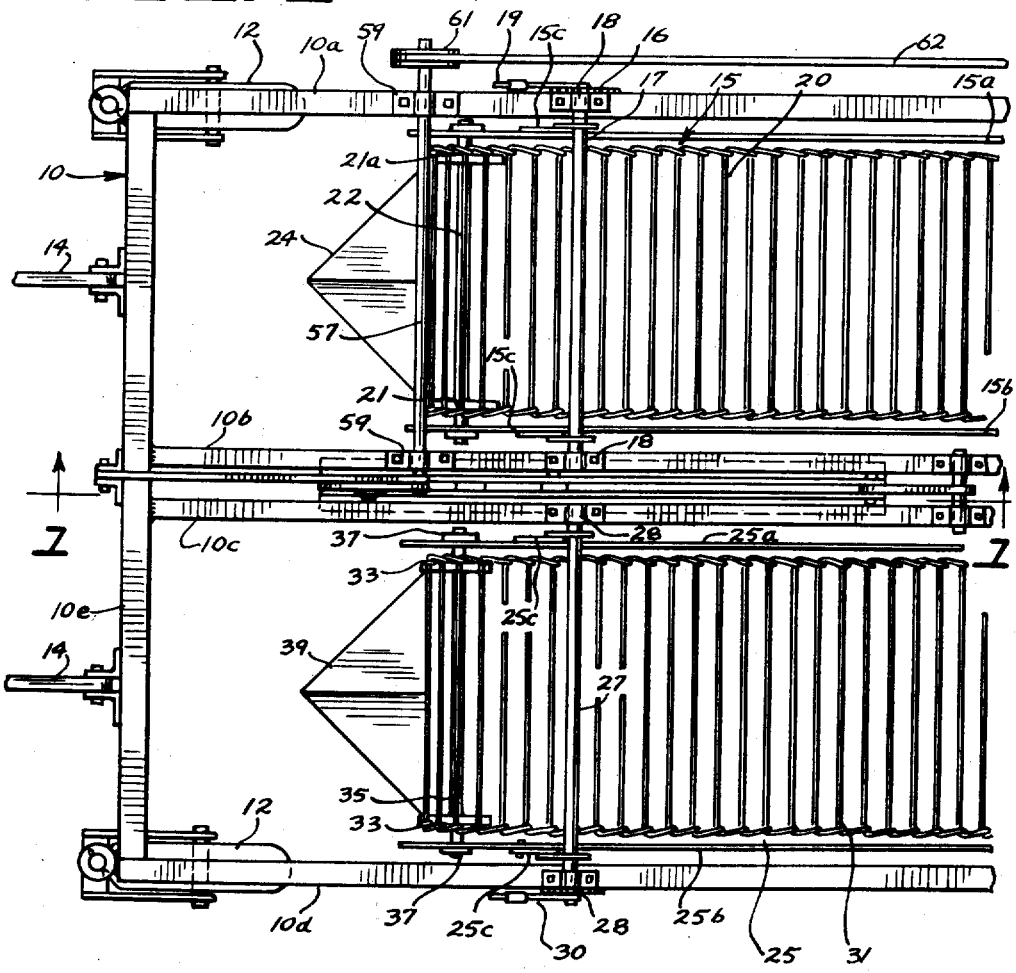
Fig. 3 is a top plan view of applicant's device.

Referring to the drawings, and particularly to Fig. 3, the front end portion of a harvester is illustrated comprising a frame 10 having spaced longitudinally extending members 10a, 10b, 10c and 10d and a transversely extending front end member 10e. Referring to Fig. 2, said member 10 has a transversely extending rearwardly disposed member 10f. Supporting said frame are wheels 12. Transversely spaced tongue members 14 are pivoted to said member 10e.

Mounted on said frame are aprons 15 and 25. Said apron 15 comprises side plate members 15a and 15b which will be pivoted at their rear end portions to said members 10a and 10b not here illustrated and which are respectively supported at their front ends by links 15c. Said links are secured to shaft 17 journaled in bearings 18 carried on said members 10a and 10b respectively. A hand operated lever 19 is secured to the outer end portion of said shaft 17 for rotating the same to actuate said links whereby said members 15a and 15b will be raised and lowered. Said lever 19 will have secured at its lower end a notched semi-circular member 19a and will be provided with a stop member 19b whereby said lever may be held in position at any desired point about said member 19a with said member 19b engaging said notches.

Disposed on said apron is a conveyor belt 20 here illustrated as being formed of spaced transversely extending rods having interlocking end portions. Said conveyor belt passes over sprockets 21 at the front end portion of said apron. Said sprockets are secured to a shaft 22 and said shaft will have its ends respectively journaled in bearings carried in said members 15a and 15b. Carried at the front end portion of said apron is a substantially V-shaped blade 24. Potato harvesters generally are adapted for digging potatoes or for digging and gathering potatoes or for gathering them only with said potatoes having been previously dug. The type of blade here illustrated is adapted particularly to gather potatoes which have already been dug and said potatoes are moved upwardly of said apron by said conveyor belt.

Said second apron 25 is identical in structure with said apron 15 and comprises side plate members 25a and 25b with said plate members being respectively pivoted at their rear end portions to said spaced members 10c and 10d not here illustrated. Said members 25a and 25b are supported at their front end portions by links 25c. Said links are secured to a shaft 27 journaled in bearings 28 respectively carried on members 10c and 10d. A lever 30 is provided identical in structure to said lever 19 having its lower end secured to said shaft 27 for rotating the same and for moving said apron 25 upwardly or downwardly. A conveyor belt 32 identical in structure to said conveyor belt 20 is disposed between said side members 25a and 25b and passes over sprockets 33 at the front end portion of said apron 25. Said sprockets are secured to a shaft 35 and said shaft is journaled in bearings 37 with said bearings being secured in said members 25a and 25b. A blade member 39 is carried at the front end of said apron 25. The structure of said harvester 10 is of a common type and the details of its structure are well known in the art.

Figure 1:
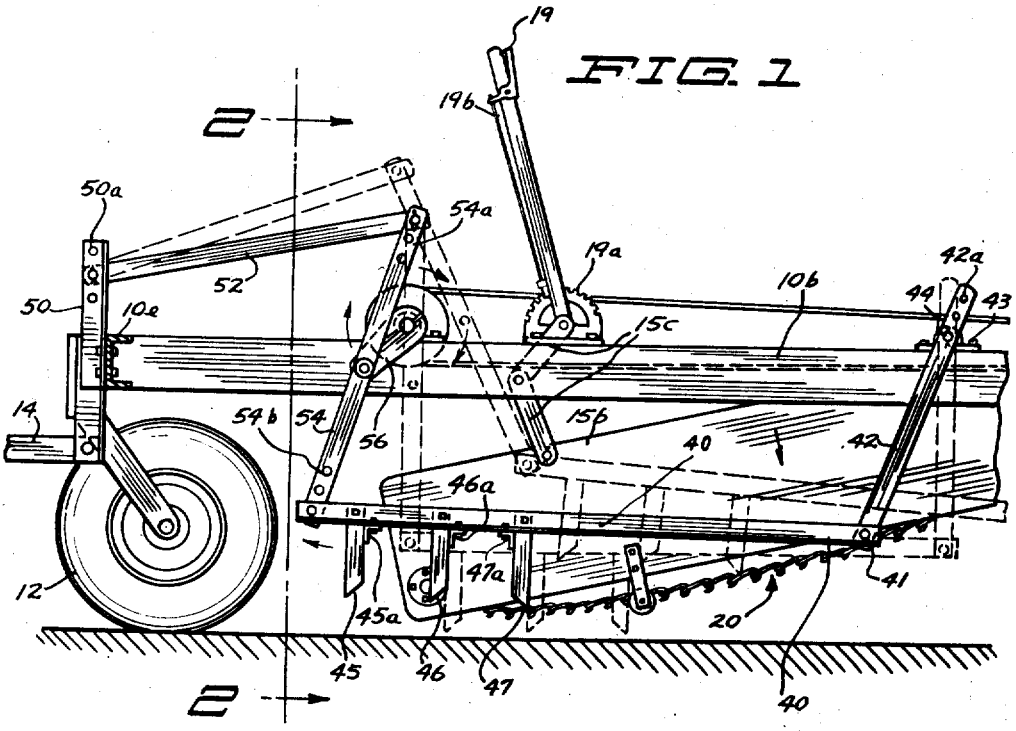
Fig. 1 is a view in *vertical section* [side elevation] taken on line 1—1 of Fig. 3, as indicated by the arrows, showing portions in different positions by dotted line.

Referring particularly to Figs. 1 and 3, *in the embodiment of applicant's invention here illustrated* a supporting bar 40 is provided. Said bar as here illustrated is comprised of two right-angled members having their adjacent sides vertically disposed. Said bar will be of substantial length and will be disposed in the space between aprons 15 and 25. Said member 40 is pivoted at its rear end to a swinging member 42 by a removable pin 41. Said member 42 is pivoted at its other end to a stationary pivot 43. Said pivot 43 is secured to members 10b and 10c. Said member 42 has a plurality of spaced apertures 42a at its other or upper end and will be pivoted to said member 43 by a bolt 44 at one of said apertures 42a. Thus the length of the swing of said member 42 is adjustable. Depending from said member 40 and secured between its adjacent sides, as by removable pins, are a plurality of spaced blades or teeth 45, 46 and 47. Said teeth 45 and 46 are held from rearward movement by angle members 45a and 46a. The tooth 47 is held from a forward swinging movement by an angle member 47a.

An upstanding stationary pivot 50 is secured to the central portion of member 10e and extends upwardly for a short distance and has a plurality of spaced apertures 50a at its upper end portion. An arm 52 is provided having one end pivoted to the upper end of said member 50 at one of said apertures 50a. An arm 54 is provided forming a swinging member and having a plurality of spaced apertures 54a at its upper end portion and spaced apertures 54b at its lower end portion. The upper end of said member 54 at one of said apertures 54a is pivoted to the other end of said member 52 and its lower end at one of said apertures 54b is pivoted to the front end portion of said bar 40. A crank 56 has one end pivoted as by a pin or bolt 56a to the central portion of said member 54. The other end of said crank is secured to a shaft 57 journaled in bearings 59 respectively secured to said members 10a and 10b. Said shaft 57 will have an end portion extending outwardly of said member 10a for a short distance and secured to said end portion is a pulley 61. Passing over said pulley 61 is a drive belt 62. Said drive belt 62 will pass over a driving member carried by said harvester and not here illustrated.

In operation, said drive belt 62 will be driven by a power means on said harvester, such as the power means used for driving the conveyors 20 and 31. Said drive belt will drive pulley 61 and rotate shaft 57. Said shaft 57 in turn will rotate crank 56 in a clockwise motion. Said crank will swing member 54. The swinging motion of member 54 will move the teeth depending from said bar 40 through an elliptical path pulling teeth 45 and 46 forwardly to break up and clear away any vines gathered in the space between said aprons 15 and 25. Said bar 40 will move forwardly and upwardly and rearwardly and downwardly. In its rearwardly and downwardly movement said [blade member] *tooth* 47 will break up and push rearwardly any vines which may have moved rearwardly between said aprons. In the rearwardly and downwardly movement of said bar 40 said teeth 45 and 46 will swing upwardly over any obstructions whereas tooth 47 is held rigidly to break up such obstructions. In the forward and upward movement of said bar 40 said teeth 45 and 46 are held rigidly in position whereas said tooth 47 is adapted to swing rearwardly over any obstructions. The use of three teeth is illustrated in the embodiment of the invention here presented but any number of teeth may be used. It has been found that the use of three teeth *is* [are] efficient in operation. Said teeth will be disposed so as to clear the surface of the ground at their lowest point.

The length of the path through which said teeth are reciprocated is easily lengthened or shortened in accordance with the effective length of said members 42, 52 and 54 which may be varied as desired depending on the apertures through which said members are respectively pivoted.

Thus it is seen that I have provided a simply constructed, easily operated and efficient device for preventing the accumulation of vines in the space between the aprons of a two-row potato harvester and for clearing away the vines from said space. Applicant's device has been thoroughly tested and has been found to be very successful in operation.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A vine clearing device used in connection with a potato harvester comprising a frame and a pair of spaced aprons having in combination, a lever having one end pivotally mounted to the front end portion of said frame centrally transversely of said aprons and extending inwardly of said frame, a second lever having one end pivotally secured to the free end of said first lever and extending downwardly, a transversely extending shaft journaled in said frame in substantially vertical alinement with the forward end portions of said aprons, a crank secured to said shaft, said second lever being pivoted to said crank intermediate its ends and a plurality of rigid blades extending downwardly to a point near the ground level operationally connected to said second lever, and means for rotating said shaft whereby said blades will be reciprocated to kick forwardly and prevent the accumulation of vines between said aprons.

2. The structure set forth in claim 1, means for holding some of said blades in rigid position when moved forwardly and permitting said blades to be pivoted freely when moved rearwardly, and means for holding the remainder of said blades in rigid position when moved rearwardly and for freely pivoting said blades when moved forwardly.

3. A vine clearing device used in connection with a potato harvester comprising a frame and a pair of spaced aprons having in combination, a lever normally in a substantially horizontal position having one end pivotally mounted to the front end portion of said frame centrally transversely of said aprons, a second lever having one end pivotally secured to the free end of said first lever and disposed in a substantially vertical position, a transversely extending shaft journaled in said frame in substantially vertical alinement with the forward end portions of said aprons, a crank secured to said shaft, said second lever being pivotally connected to said crank centrally thereof, and means for rotating said shaft whereby said second lever is reciprocated through an elliptical path, a plurality of rigid blades extending downwardly substantially to ground level connected to said second lever and means to hold said blades rigid during the forward motion of said second lever and freely pivoted during the rearward motion of said second lever.

4. A vine clearing device used in connection with a potato harvester comprising a frame and a pair of spaced aprons having in combination, an arm comprising an elongated bar pivoted at one end to the front end portion of said frame centrally of said aprons and extending longitudinally of said frame, a second arm having one end pivoted to the free end of said first arm, a shaft journaled in said frame transversely thereof in vertical alinement with the front end portions of said aprons, a crank secured to said shaft in alinement with said first arm, said second arm pivoted centrally thereof to said crank and having its lower portion extend below the level of said frame, and means carried by said frame for rotating said shaft and said crank, a third arm spaced rearwardly longitudinally of said frame from said second arm and pivoted to said frame and depending therefrom between said aprons, an elongated bar pivoted at each end respectively to the free ends of said second and third arms and being disposed below the level of said frame, a plurality of spaced rigid blades extending substantially to ground level pivoted to said bar whereby said bar and blades are reciprocated by said first and second arms as said crank is rotated.

5. The structure set forth in claim 4, means for holding some of said blades in rigid position during the forward motion of said bar and permitting said blades to pivot freely on the rearward motion of said bar, and means for holding the remainder of said blades in rigid position during the rearward motion of said bar and in a freely pivoted position during the forward motion of said bar.

*6. A vine clearing device used in connection with a potato harvester comprising a frame and a pair of spaced aprons having in combination, an arm having one end pivotally mounted to the front end portion of said frame, a second arm having one end pivotally secured to the free end of said first arm and extending downwardly, a transversely extending shaft journaled in said frame, a crank secured to said shaft, said second arm being pivoted to said crank intermediate its ends, and a blade operationally connected to said second arm and extending downwardly to a point near the ground level, and means for rotating said shaft whereby said blade will be reciprocated.*

*7. A vine clearing device used in connection with a potato harvester comprising a frame and a pair of spaced aprons having in combination, an arm having one end pivoted to said frame, a second arm having one end pivotally secured to the free end of said first arm and disposed in a substantially vertical position, a transversely extending shaft journaled in said frame, a crank secured to said shaft, said second arm being pivotally connected to said crank, means for rotating said shaft, and a blade operationally connected to said second arm and extending downwardly to a point adjacent the ground level whereby said blade is reciprocated through an elliptical path.*

*8. A vine clearing device used in connection with a potato harvester comprising a frame and a pair of spaced aprons having in combination, a transversely extending shaft journaled in said frame, driving means associated with said harvester for rotating said shaft, a crank secured to said shaft, an arm disposed in a substantially vertical position, said arm being pivoted to said crank at a point intermediate its ends, means associated with said harvester connected to the upper end of said arm for limiting the movement of the upper end of said arm, and a blade extending downwardly to a point near the ground level being operationally connected to said arm whereby said blade is moved through an elliptical path for reciprocation.*

References Cited in the file of this patent or the original patent

| | | |
|---|---|---|
| 1,262,674 | Jones | Apr. 16, 1918 |
| 2,452,418 | Zuckerman | Oct. 26, 1948 |
| 2,484,496 | Gordon | Oct. 11, 1949 |
| 2,547,355 | Young | Apr. 3, 1951 |